United States Patent [19]

Kelly

[11] 4,086,680

[45] May 2, 1978

[54] CASTER MOUNT ASSEMBLY

[75] Inventor: Eric L. Kelly, Rowley, Mass.

[73] Assignee: Purex Corporation, Lakewood, Calif.

[21] Appl. No.: 678,450

[22] Filed: Apr. 19, 1976

[51] Int. Cl.² .................. B60B 33/04; B62B 3/02; B62B 5/00
[52] U.S. Cl. .......................................... 16/30; 220/69; 280/47.32; 280/79.2
[58] Field of Search ............... 16/29, 30; 220/69; 280/79.2, 47.32; 248/129

[56] References Cited

U.S. PATENT DOCUMENTS

| 1,130,684 | 3/1915 | Brown | 16/30 |
| 2,137,560 | 11/1938 | Anderson | 16/30 |
| 2,543,697 | 2/1951 | Lauter | 16/29 |
| 2,567,185 | 9/1951 | Coviello | 16/30 |
| 2,772,889 | 12/1956 | Reynolds | 16/30 |
| 3,463,505 | 8/1969 | German et al. | 16/30 |

Primary Examiner—Werner H. Schroeder
Assistant Examiner—Conrad L. Berman
Attorney, Agent, or Firm—William W. Haefliger

[57] ABSTRACT

A wheel connection to a receptacle having a bottom wall and a bead projecting downwardly below the level of said bottom wall, comprises:
(a) a wheel carrier adapted to extend at the outer side of the bead,
(b) means on the carrier including an L-shaped bracket having a vertical leg, and an adjustable threaded fastener, for releasably retaining the bead between the vertical leg and the carrier, the bracket having an upper horizontal leg to extend in supporting relation directly beneath the receptacle bottom wall, and
(c) the carrier defining a laterally presented shoulder for engagement with the outer side of the receptacle at a location above the level of the bracket and bead.

2 Claims, 8 Drawing Figures

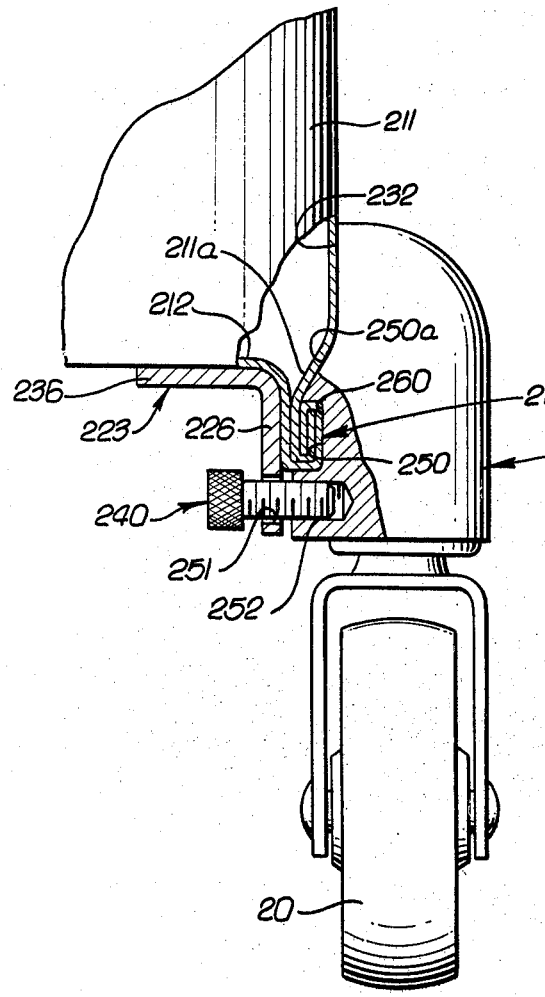
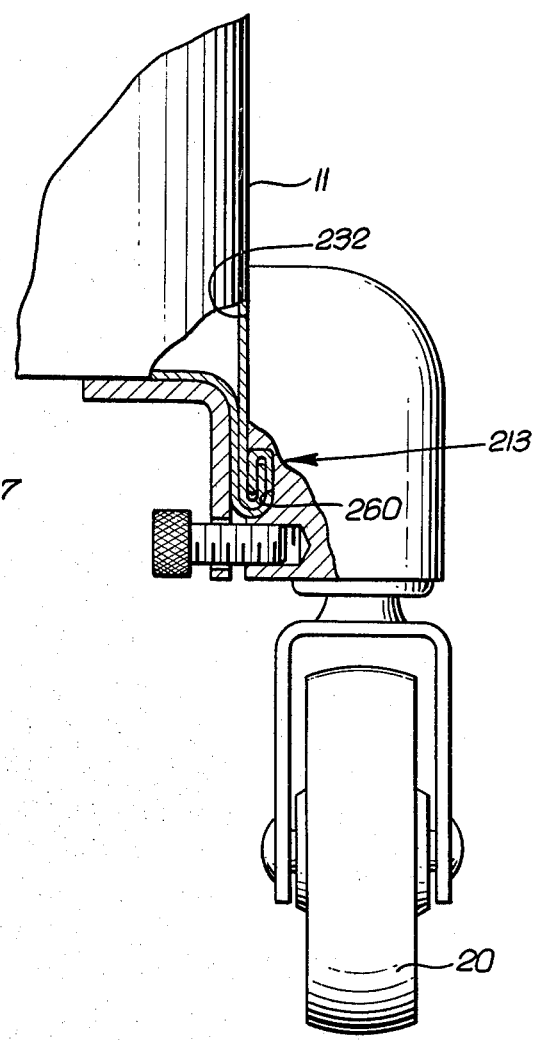

CASTER MOUNT ASSEMBLY

BACKGROUND OF THE INVENTION

This invention relates generally to the wheeled support of cannisters or receptacles, and more particularly concerns the caster mounting of receptacles characterized as having downwardly presented beaded edges.

In the past, caster mounts were permanently welded to vacuum cleaner receptacles or cannisters; however, welding often resulted in damage to the can and/or breakage of the caster mount. Also, an undesirably large inventory of mounts and different size cans was required, since there was commercial need for cannisters with one, two, three or four legs.

SUMMARY OF THE INVENTION

It is a major object of the invention to provide an improved caster connection to vacuum cleaner cannisters, and characterized by ease of removable attachment to the cannister bead, whereby any number of casters may readily be well attached to a receptacle or removed therefrom to suit commercial requirements, the receptacle characterized as having a downwardly projecting peripheral bead. As a result, no welding is required; the inventory of different can sizes may be substantially reduced; any size cannister can be used with any usable vacuum cleaner, and with any number of legs; and the user can easily replace broken casters.

Basically, the connection comprises:

(a) a wheel carrier adapted to extend at the outer side of the bead, (b) an L-shaped bracket connected with the carrier and having an upright leg adjacent which the bead is relatively downwardly receivable between the upright leg and the carrier, and a horizontal leg to extend beneath the receptacle bottom wall, and (c) means on the bracket for releasably retaining the bracket attached to the bead.

Further, the carrier may be precisely located relative to the bead and can by means of a curved key or abutment fitted between the bead and the carrier and also by a carrier shoulder engageable with the can side wall directly above the key, as will be seen; set screws may be employed in concealed positions beneath the cannister to attach the bracket to the bead; and an additional bracket horizontal leg may extend beneath the bead. As a result, the easters may be easily shifted along the bead to any single or group positions desired, and they may be readily replaced.

These and other objects of this invention, as well as the details of an illustrative embodiment will be more fully understood from the following description and drawings, in which:

DRAWING DESCRIPTION

FIGS. 7 and 8 are views like FIG. 2 showing additional modifications.

DETAILED DESCRIPTION

Figure 1:
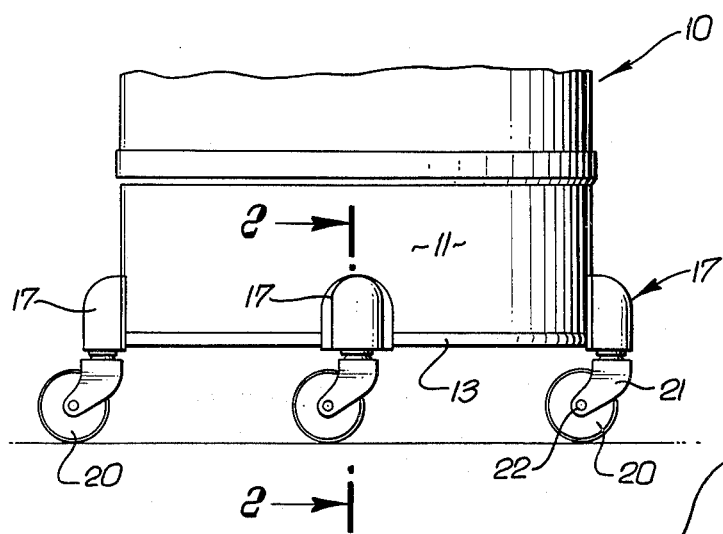
FIG. 1 is a side elevation showing vacuum cleaner can or receptacle mounting on casters in accordance with the invention.

In the drawings, a vacuum cleaner cannister receptacle 10 has a side wall 11, a bottom wall 12 and a rolled bead 13 joining these walls. The bead is annular, and projects downwardly. The bead has lateral walls 14 and 15, and a bottom wall 16.

In accordance with the invention, a wheel carrier 17 is adapted to extend at the radially outer side of the bead, and may for example define a vertical socket or bore 18 sized to receive a caster pin 19. The pin is rotatable in the socket about a vertical axis, and carries a caster wheel 20, as via a fork 21 attached to the pin. The wheel axle appears at 22.

Also in accordance with the invention, an L-shaped bracket is connected with the carrier, an example being bracket 23 whose first laterally extending leg 24 is connected with the carrier at lap joint 25. The bracket, which is elongated in the direction of the bead annular extent, has a second leg 26 which is upstanding so as to define with the carrier 17 a space into which the bead 13 is relatively downwardly receivable above the first leg. In this regard, the bottom wall 16 of the bead may seat on the leg 24.

Figure 3:
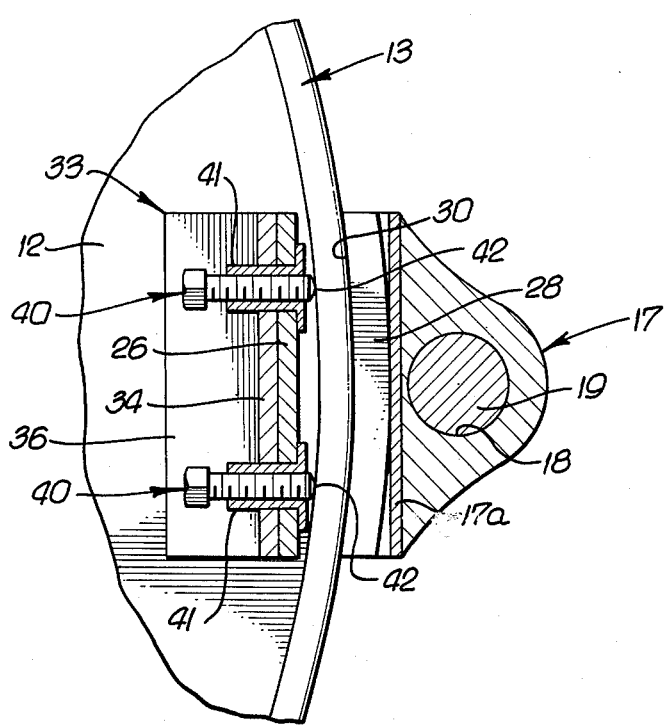
FIG. 3 is a horizontal section on lines 3—3 of FIG. 2.

The connection may also include an abutment such as key 28 which is attached as at 29 to the carrier at the side of the latter facing the second leg 26; further, the abutment is located above the first leg to fit against the bead (and thereby locate the caster wheel carrier). In this regard, the key may have a generally rectangular cross section so as to fit between the bead wall 15 and the carrier wall at 17a; also, the key inner wall 30 in FIG. 3 is curved to match the bead curvature above the receptacle, to precisely locate the caster carrier in annular relation to the cannister 10, and also to provide maximum frictional gripping to the bead, when the bracket is attached to the bead. Keys of different wall curvature 30 may be employed for different curvature beads.

Precise location of the caster carrier relative to the cannister in a vertical sense is provided by the carrier laterally presented upper shoulder 32, which engages the cannister outer side wall at a location directly above the center portion 30a of the key wall 30.

The connecter also includes a second L-shaped bracket 33, one leg 34 of which is integral with second leg 26 of the first bracket, welds being shown at 35. The second leg 36 of bracket 33 extends directly beneath and supports the bottom wall 12 of the cannister.

Means provided to releasably retain the bracket 23 to the bead may advantageously take the form of set screws 40 projecting through legs 26 and 34 at spaced locations along the bead. FIG. 3 shows the screw shanks received through interiorly threaded sleeves 41, the latter suspended by the legs as referred to. When the beads of the screws are tightened, the pointed ends 42 engage the bead wall 14. Note that fasteners 40 are out of alignment with pin 19, and define axes extending at opposite sides of the pin.

FIG. 1 shows multiple caster connections to the receptacle, each connector having the simple and effective construction, as described.

Figure 2:
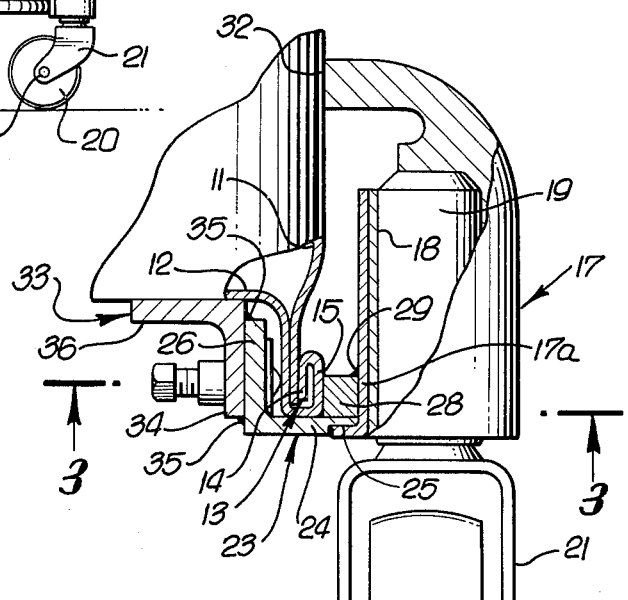
FIG. 2 is an enlarged section on lines 2—2 of FIG. 1.
Figure 4:
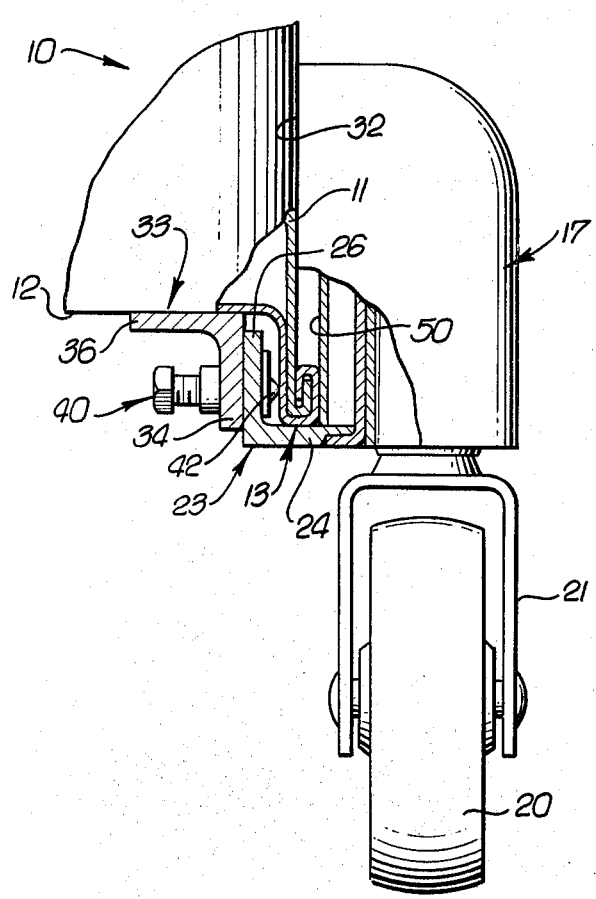
FIG. 4 is a view like FIG. 2 showing a modification.

The design of the FIG. 4 connection is the same as illustrated in FIG. 2, with the exception that the key or abutment 28 is omitted. Consequently, the bead 13 is clamped between the inner side wall 50 of the carrier 17 and the pointed tip or tips 42 of the fastener or fasteners 40. Note the L-shaped brackets 23 and 33, as before, having legs 24, 26, 34 and 36. Leg 24 is connected to the carrier. The latter extends in suppporting relation to the bottom wall 12 of the cannister. Carrier upper side wall 32 engages the cannister outer side wall, as before.

Figure 5:
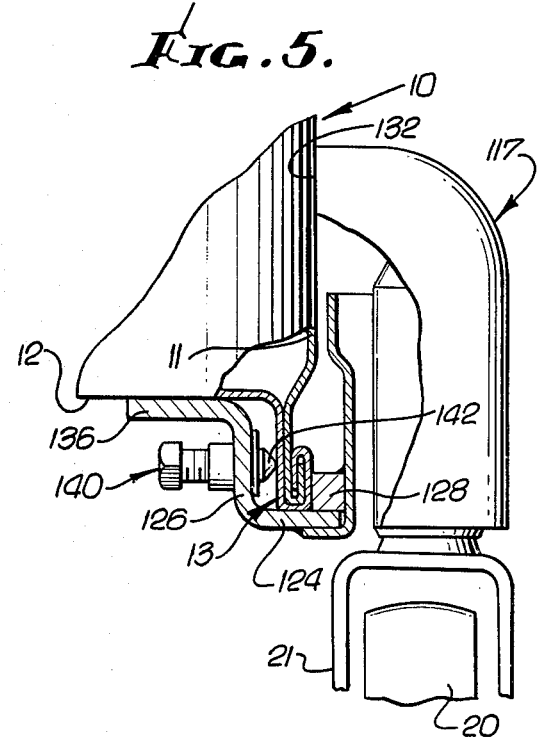
FIGS. 5 and 6 are views like FIG. 2 showing further modifications.
Figure 6:
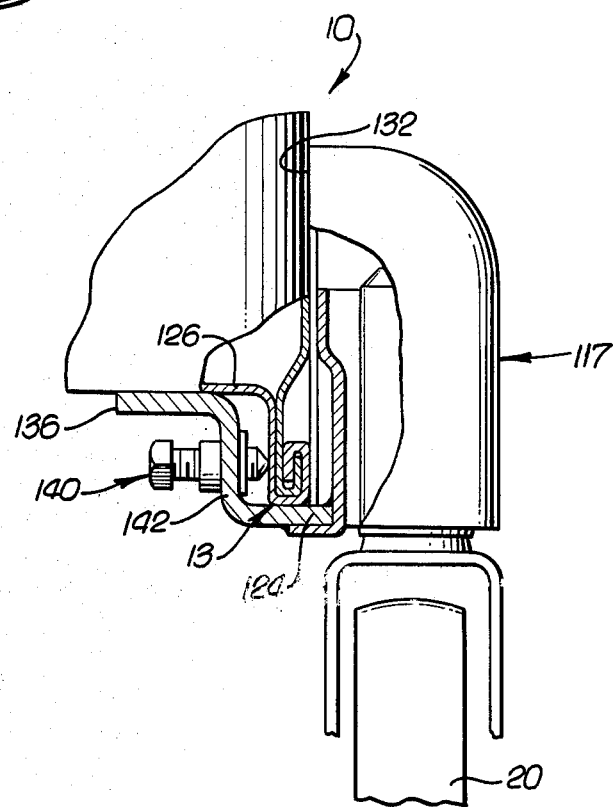

The design of the FIG. 5 connection is basically the same as in FIG. 2, with the exception that the two L-shaped brackets are made in one piece, with a single vertical leg 126, an upper horizontal leg 136 to engage the bottom of the cannister, and a lower horizontal leg 124 connected with the carrier 117. Key 128 is connected with the carrier and leg 124, as by welding, to receive the bead between the key and leg 126. The pointed end 142 of the fastener 140 is adapted to releasably engage the bead. The elements of FIG. 6 design are the same as in FIG. 5, excepting that the key 128 is omitted. In both FIGS. 5 and 6, the carrier upper side shoulder 132 corresponds to shoulder 32 in FIG. 2.

In FIG. 7, a wheel carrier 217 is adapted to extend at the outer side of cannister bead 213. An L-shaped bracket 223 is on the carrier and includes a vertical leg 226 and a horizontal leg 236 to extend in under supporting relation beneath the receptacle or cannister bottom wall 212.

An adjustable threaded fastener 240 is provided on the carrier for releasably retaining the bead 213 between the bead and the carrier inner side wall 250. Note that the fastener extends through a drilled opening 251 in leg 226, and has threaded connection at 252 on the carrier body, permitting tightening of the fastener bead 253 against leg 226 and clamping of the bead between leg 226 and wall 250. Two fasteners may be employed as in FIGS. 1–3. The upper extent 250a of wall 250 is arcuately concavely shaped to closely fit the cannister convex lower wall extent 211a. Also, the carrier has a laterally presented shoulder 232 engaging the outer side 211 of the receptacle above the bead and bracket level.

The design of the FIG. 8 connection is the same as in FIG. 7, excepting that the bead 213 extends directly below wall 11, so that the arcuate wall extents 211a and 250a are omitted. Instead, the shoulder 232 extends vertically all the way down to the bead. In both FIGS. 7 and 8 a notch 260 is provided in the carrier body to closely receive the bead 213 for orienting the carrier in upright position.

I claim:

1. In combination with a receptacle having a side wall, a botton wall, and a bead projecting downwardly below the level of said bottom wall, a wheel connection comprising
   (a) a wheel carrier extending at the outer side of the bead,
   (b) a Z-shaped bracket connected with the carrier and having a first leg extending laterally therefrom directly under the bead and a second leg extending upwardly from the first leg so as to define with the carrier a space into which the bead is relatively downwardly receivable between the second leg and the carrier and above the first leg, the second leg laterally spaced from the bead, there being spacer structure located above the first leg and extending lengthwise of the bead to position the carrier relative to the bead, and
   (c) means on the bracket for releasably retaining the bracket attached to the bead, said means comprising two threaded fasteners extending laterally through the second leg to project proximate the bead at the inner side thereof, the fasteners having heads at the inner side of the second leg remote from the bead, the heads being rotatable to cause the fasteners to clamp the bracket to the bead, the bracket having a laterally extending third leg defining a shoulder which extends laterally away from the bead and above the levels of the bead and heads in directly under supporting relation to the receptacle bottom,
   (d) the carrier defining a laterally presented shoulder in engagement with the outer side of the receptacle side wall at a location above the bracket and head,
   (e) the carrier receiving a vertically extending caster pin, said fasteners being out of alignment with said pin and defining axes extending generally horizontally at opposite sides of said pin.

2. A wheel connection to a receptacle having a bottom wall and a bead projecting downwardly below the level of said bottom wall, comprising
   (a) a wheel carrier adapted to extend at the outer side of the bead,
   (b) means on the carrier including an angled bracket having a vertical leg, and an adjustable threaded fastener projecting proximate the bead and extending through the bracket for releasably retaining the bead between said vertical leg and the carrier, said bracket having an upper horizontal leg to extend in supporting relation directly beneath the receptacle bottom wall, said fastener having an adjustment head located directly below said upper horizontal leg,
   (c) the carrier defining a laterally presented shoulder for engagement with the outer side of the receptacle at a location above the level of said bracket and bead, and
   (d) the carrier inner side wall defining a notch for closely receiving the bead, the bead and notch having complementary configuration.

* * * * *